(12) United States Patent
Matsumoto

(10) Patent No.: US 10,759,445 B2
(45) Date of Patent: Sep. 1, 2020

(54) DRIVING ASSISTANCE DEVICE AND DRIVING ASSISTANCE METHOD

(71) Applicant: DENSO TEN Limited, Kobe-shi, Hyogo (JP)

(72) Inventor: Hiroshi Matsumoto, Kobe (JP)

(73) Assignee: DENSO TEN Limited, Kobe (JP)

( * ) Notice: Subject to any disclaimer, the term of this patent is extended or adjusted under 35 U.S.C. 154(b) by 207 days.

(21) Appl. No.: 15/918,461

(22) Filed: Mar. 12, 2018

(65) Prior Publication Data

US 2018/0362052 A1    Dec. 20, 2018

(30) Foreign Application Priority Data

Jun. 15, 2017  (JP) .................. 2017-118015

(51) Int. Cl.
| | | |
|---|---|---|
| *G05D 1/00* | (2006.01) | |
| *B60W 50/08* | (2020.01) | |
| *B60W 50/00* | (2006.01) | |
| *B60W 50/14* | (2020.01) | |

(52) U.S. Cl.
CPC ...... *B60W 50/082* (2013.01); *B60W 50/0097* (2013.01); *B60W 50/14* (2013.01); *G05D 1/0061* (2013.01); *G05D 1/0088* (2013.01); *B60W 2540/26* (2013.01); *G05D 2201/0213* (2013.01)

(58) Field of Classification Search
CPC .................. B60W 50/082; B60W 50/0097
See application file for complete search history.

(56) References Cited

U.S. PATENT DOCUMENTS

| | | | | | |
|---|---|---|---|---|---|
| 9,651,947 | B2* | 5/2017 | Kim | .................... | B60W 50/082 |
| 9,676,395 | B2* | 6/2017 | Siddiqui | ............... | B60W 40/08 |
| 10,343,698 | B2* | 7/2019 | Poeppel | ................ | B60W 50/12 |
| 10,399,576 | B2* | 9/2019 | Suzuki | ............. | B60W 60/0055 |
| 10,528,047 | B1* | 1/2020 | Trujillo | ................ | B60W 40/09 |
| 10,543,853 | B2* | 1/2020 | Toyoda | ............... | B60W 50/085 |
| 10,642,266 | B2* | 5/2020 | Tsai | .................... | B60W 60/0053 |
| 2010/0030434 | A1* | 2/2010 | Okabe | ..................... | A61B 5/18 |
| | | | | | 701/48 |
| 2012/0083960 | A1* | 4/2012 | Zhu | ........................... | B60R 1/00 |
| | | | | | 701/23 |
| 2013/0226408 | A1* | 8/2013 | Fung | ..................... | B60W 40/09 |
| | | | | | 701/41 |

(Continued)

FOREIGN PATENT DOCUMENTS

| | | | | | |
|---|---|---|---|---|---|
| JP | 2015-153048 | | * 8/2015 | ........... | B60W 50/14 |
| JP | 2015-153048 A | | 8/2015 | | |

*Primary Examiner* — Jonathan M Dager
(74) *Attorney, Agent, or Firm* — Oliff PLC

(57) ABSTRACT

There is provided a driving assistance device for supporting driving of a vehicle equipped with the driving assistance device such that if a driver starts a driving-related operation in the course of self-driving, switching from self-driving to manual driving is performed. An acquiring unit configured to acquire conditions of the driver. A determining unit configured to determine to invalidate switching to manual driving in the case where the conditions of the driver acquired when the operation was started represents a non-waking state, and determine to continue the invalidation for a predetermined period if the driver changes from the non-waking state to a waking state when the invalidation is being performed.

5 Claims, 7 Drawing Sheets

(56) References Cited

U.S. PATENT DOCUMENTS

| | | | | |
|---|---|---|---|---|
| 2014/0156133 A1* | 6/2014 | Cullinane | B60R 16/023 | 701/23 |
| 2014/0156157 A1* | 6/2014 | Johnson | B60T 7/22 | 701/70 |
| 2014/0303827 A1* | 10/2014 | Dolgov | B60W 30/00 | 701/23 |
| 2015/0025731 A1* | 1/2015 | Uehara | B60W 50/14 | 701/23 |
| 2015/0120124 A1* | 4/2015 | Bartels | B60W 50/14 | 701/23 |
| 2015/0142244 A1* | 5/2015 | You | G05D 1/0061 | 701/23 |
| 2015/0274158 A1* | 10/2015 | Fujita | B60W 30/00 | 701/23 |
| 2015/0353088 A1* | 12/2015 | Ishikawa | G05D 1/0061 | 701/23 |
| 2016/0001781 A1* | 1/2016 | Fung | G16H 50/20 | 701/36 |
| 2016/0207538 A1* | 7/2016 | Urano | G05D 1/0061 | |
| 2016/0311440 A1* | 10/2016 | Gan | G08B 21/06 | |
| 2016/0355190 A1* | 12/2016 | Omi | B60W 30/12 | |
| 2017/0028995 A1* | 2/2017 | Mori | B60Q 9/008 | |
| 2017/0032200 A1* | 2/2017 | Schmidt | B60Q 9/00 | |
| 2017/0057520 A1* | 3/2017 | Letwin | G05D 1/0061 | |
| 2017/0234691 A1* | 8/2017 | Abramson | G01C 21/3626 | 701/442 |
| 2017/0305440 A1* | 10/2017 | Oba | B60W 50/08 | |
| 2017/0313319 A1* | 11/2017 | Kishi | G05D 1/0248 | |
| 2017/0368936 A1* | 12/2017 | Kojima | B60K 28/06 | |
| 2018/0050698 A1* | 2/2018 | Polisson | B60W 60/00 | |
| 2018/0093675 A1* | 4/2018 | Holub | B60W 50/14 | |
| 2018/0173227 A1* | 6/2018 | Mukai | B60W 50/14 | |
| 2018/0194365 A1* | 7/2018 | Bae | B60W 40/08 | |
| 2018/0196427 A1* | 7/2018 | Majumdar | B60W 60/005 | |
| 2018/0284759 A1* | 10/2018 | Michalakis | B60W 50/082 | |
| 2018/0290660 A1* | 10/2018 | Huang | G06K 9/00268 | |
| 2018/0329414 A1* | 11/2018 | Igarashi | G08G 1/16 | |
| 2018/0339714 A1* | 11/2018 | Smid | B60W 50/0097 | |
| 2018/0362052 A1* | 12/2018 | Matsumoto | G05D 1/0061 | |
| 2019/0047588 A1* | 2/2019 | Yabuuchi | B60W 60/0053 | |
| 2019/0056732 A1* | 2/2019 | Aoi | G05D 1/0061 | |
| 2019/0143990 A1* | 5/2019 | Kim | B60W 40/08 | 701/27 |
| 2019/0187700 A1* | 6/2019 | Zheng | B60W 60/0059 | |
| 2019/0265699 A1* | 8/2019 | Yabuuchi | A61B 5/18 | |
| 2019/0291747 A1* | 9/2019 | Chiba | G08G 1/00 | |
| 2019/0329791 A1* | 10/2019 | Oba | G05D 1/0212 | |
| 2020/0019163 A1* | 1/2020 | Horii | B60W 50/082 | |
| 2020/0064834 A1* | 2/2020 | Hyuga | G08G 1/16 | |

* cited by examiner

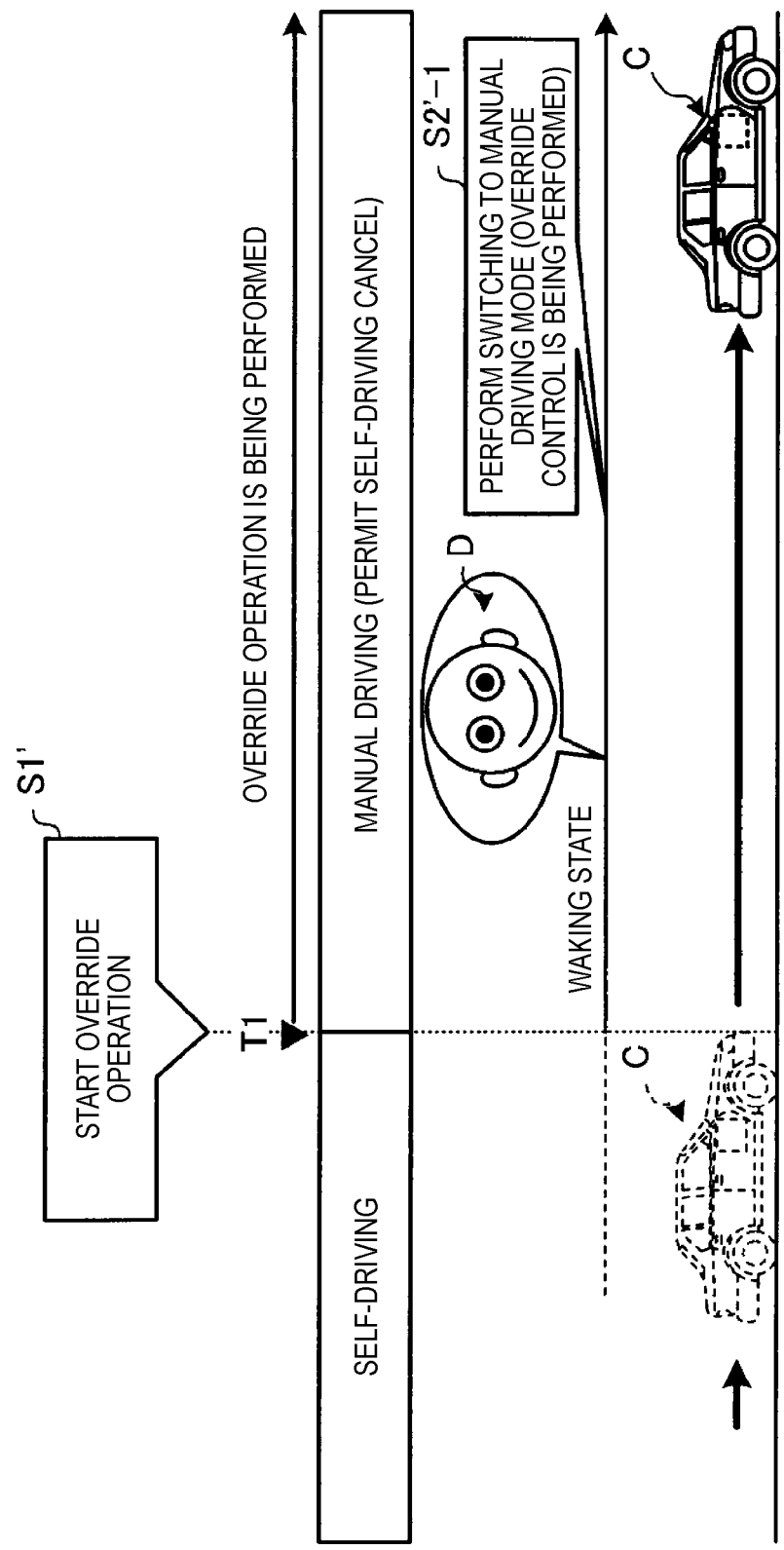

000# DRIVING ASSISTANCE DEVICE AND DRIVING ASSISTANCE METHOD

CROSS-REFERENCE TO RELATED APPLICATIONS

This application is based on and claims priority under 35 USC 119 from Japanese Patent Application No. 2017-118015 filed on Jun. 15, 2017.

TECHNICAL FIELD

The present disclosure relates to a driving assistance device and a driving assistance method.

BACKGROUND

In the related art, self-driving technologies for making vehicles travel by themselves without driver's participation in a variety of control such as acceleration, steering, and braking are known. Also, an override technology for switching a vehicle from a self-driving mode to a manual driving mode if a driver's operation related to driving of the vehicle is received in the course of self-driving while using such a self-driving technology is known (see Patent Document 1 for instance).

Also, technologies for acquiring awakening conditions of a driver if a driver's override operation is received and invalidating switching to a manual driving mode if the driver is in a non-waking state such as a dozing state have been proposed.

[Patent Document 1] Japanese Patent Application Laid-Open No. 2015-153048

However, the above-mentioned technologies of the related art have room for further improvement in preventing a vehicle from getting into a dangerous situation in the case where the driver changes from the non-waking state to a waking state in the course of an override operation.

Specifically, in the case where the driver has changed from the non-waking state to the waking state in the course of an override operation, it is difficult to consider that the override operation has been intentionally performed. For this reason, in the case where switching to the manual driving mode is easily performed if the driver says that he has awakened, the driver may abruptly change the vehicle in alarm, thereby putting the vehicle in a dangerous situation.

SUMMARY

It is therefore an object of the present disclosure to provide a driving assistance device and a driving assistance method capable of preventing a vehicle from getting into a dangerous situation even if the driver changes from a non-waking state to a waking state in the course of an override operation.

According to an aspect of the embodiments of the present invention, there is provided a driving assistance device for supporting driving of a vehicle equipped with the driving assistance device such that if a driver starts a driving-related operation in the course of self-driving, switching from self-driving to manual driving is performed, including: an acquiring unit configured to acquire conditions of the driver; and a determining unit configured to determine to invalidate switching to manual driving in the case where the conditions of the driver acquired when the operation was started represents a non-waking state, and determine to continue the invalidation for a predetermined period if the driver changes from the non-waking state to a waking state when the invalidation is being performed.

According to the present disclosure, it is possible to prevent a vehicle from getting into a dangerous situation even if the driver changes from the non-waking state to the waking state in the course of an override operation.

BRIEF DESCRIPTION OF THE DRAWINGS

Exemplary embodiments of the present invention will be described in detail based on the following figures, wherein:

FIG. 1A is a view for explaining a first part of an outline of a driving assistance method according to a comparative example;

DETAILED DESCRIPTION

Figure 1B:
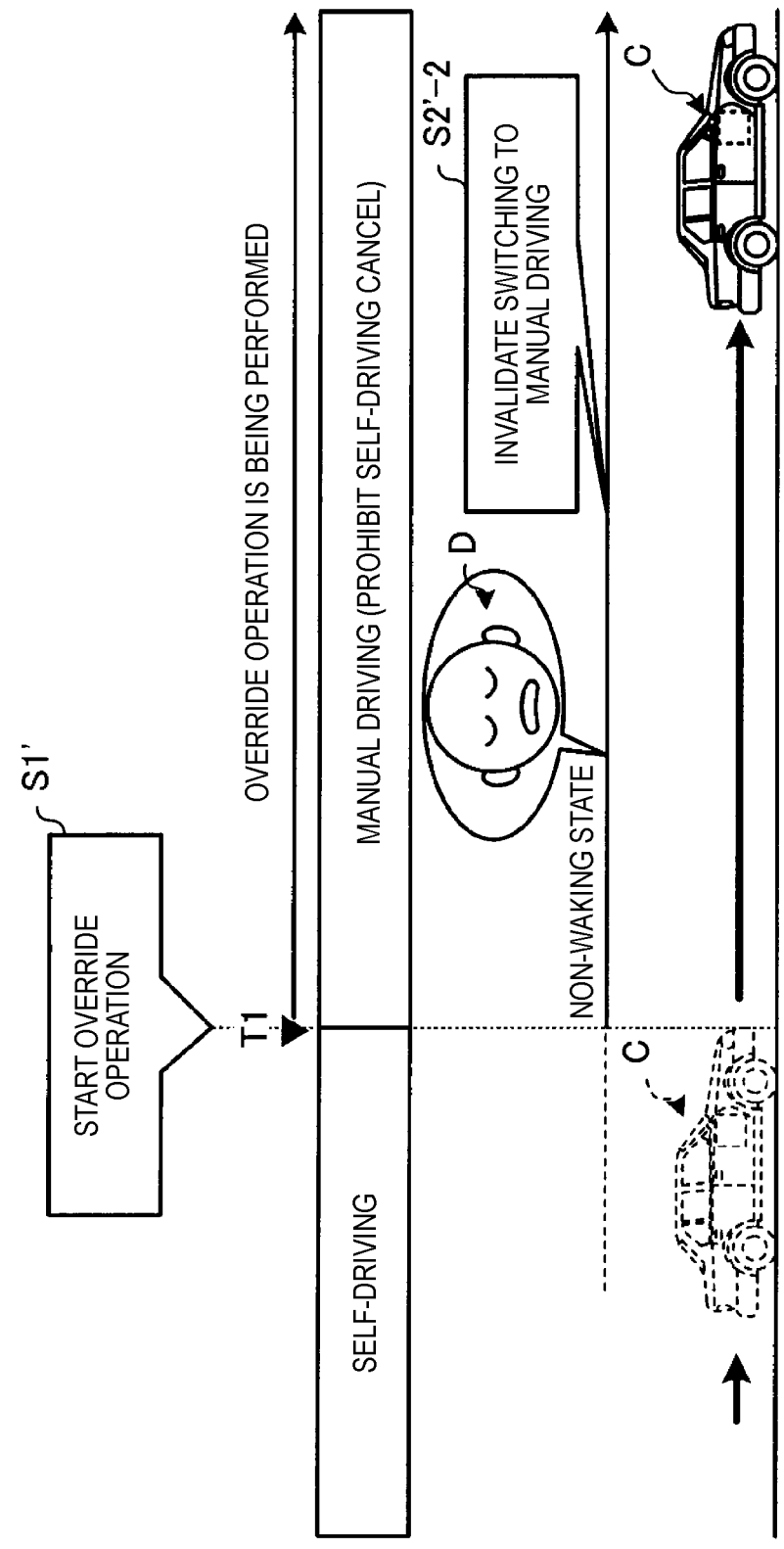
FIG. 1B is a view for explaining a second part of the outline of the driving assistance method according to the comparative example.

Hereinafter, with reference to the accompanying drawings, an embodiment of a driving assistance device and a driving assistance method of the embodiments of the present invention will be described in detail. However, the present invention is not limited to by the following embodiments.

Also, hereinafter, an outline of a driving assistance method according to the present embodiment will be described first with reference to FIG. 1A to FIG. 1C, and then a driving assistance device 10 adopting the driving assistance method according to the present embodiment and an in-vehicle system 100 having the driving assistance device will be described with reference to FIG. 2A to FIG. 3B.

Also, hereinafter, self-driving means fully self-driving capable of making a vehicle travel by itself while controlling acceleration, steering, and braking in a state where the driver does not participate in control at all.

First, the outline of the driving assistance method according to the present embodiment will be described with reference to FIG. 1A to FIG. 1C. FIG. 1A and FIG. 1B are views for explaining a first part and a second part of an outline of a driving assistance method according to a comparative example. Also, FIG. 1C is a view for explaining the outline of the driving assistance method according to the present embodiment.

As shown in FIG. 1A, in the driving assistance method according to the comparative example, in the case where a driver D starts an override operation at a time T1 (STEP S1'), if the driver D is in the waking state, a vehicle C is switched to a manual driving mode (STEP S2'-1) such that the driver D manually drives. In other words, in the course of the override operation, self-driving cancel is permitted, and the vehicle C is switched to an override control mode.

Here, the override operation is an operation which the driver D performs with respect to driving of the vehicle C, and is, for example, an operation on an accelerator pedal, an operation on a brake pedal, an operation on a steering wheel, or the like which the driver D performs.

When the driver D is performing an override operation, if he is in the waking state, since it is recognized that the corresponding override operation is being intentionally performed by the driver D, even if the vehicle C is switched from the self-driving mode to the manual driving mode, the vehicle C is unlikely to get into a dangerous situation due to abrupt change or the like. Also, although not shown in the drawings, if the driver D releases the override operation, the vehicle C returns to the self-driving mode.

Also, as shown in FIG. 1B, in the driving assistance method according to the comparative example, even if the driver D starts an override operation at the time T1 (STEP S1'), if the driver D is in the non-waking state, switching to manual driving is invalidated (STEP S2'-2), and self-driving is continued without performing switching to the manual driving mode. In other words, here, even though the override operation is being performed, self-driving cancel is prohibited, and the vehicle C continues self-driving control without transitioning to override control.

When the driver D is performing an override operation, as long as he is in the non-waking state, if the vehicle C is switched from the self-driving mode to the manual driving mode, inevitably, the vehicle C is put into a dangerous situation. Therefore, in this case, self-driving is continued such that the vehicle C is prevented from getting into a dangerous situation.

Figure 1C:
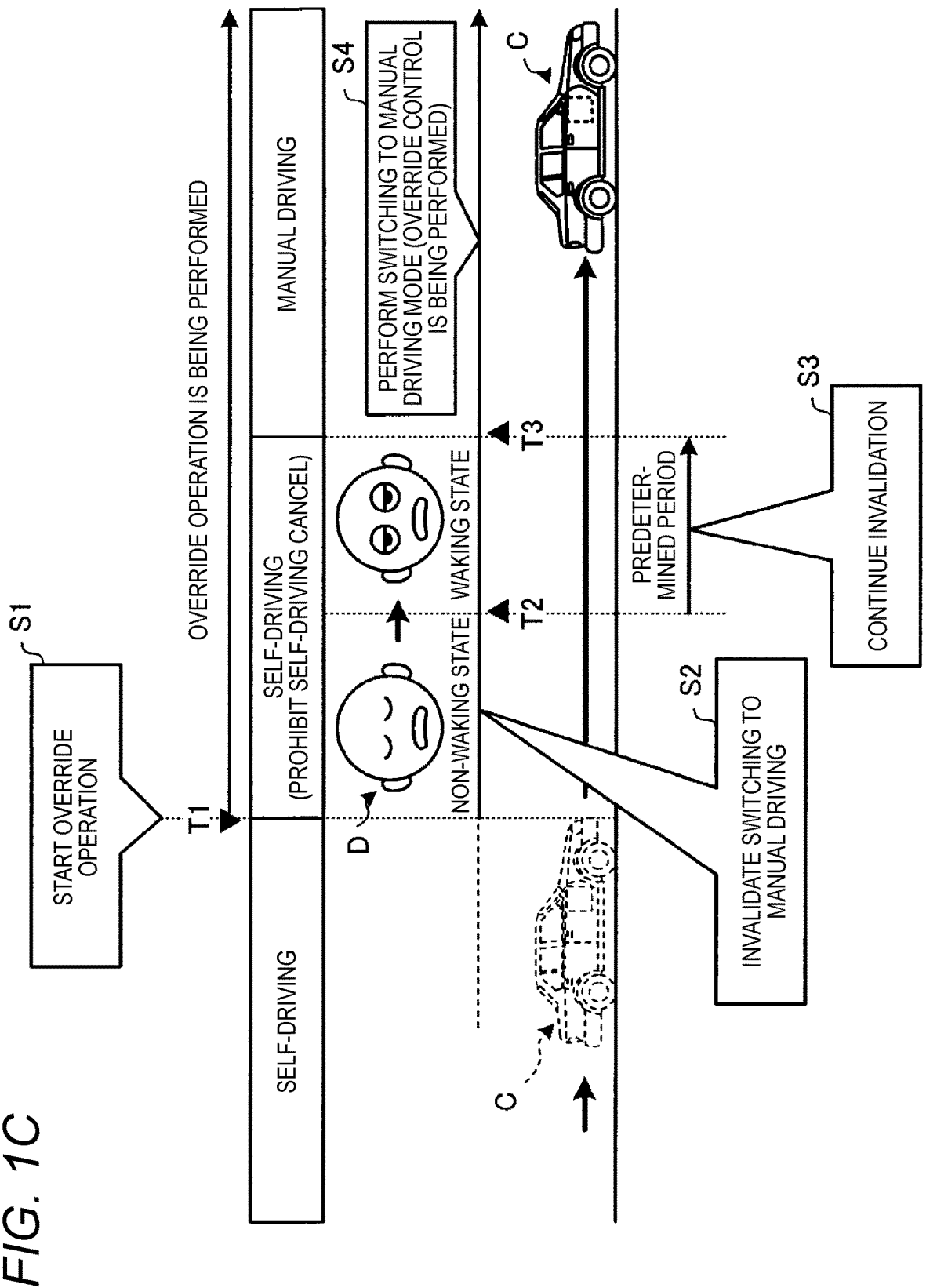
FIG. 1C is a view for explaining an outline of a driving assistance method according to an embodiment.

Here, it is assumed that, as shown in FIG. 1C, at a time T1 when the driver D started an override operation, the driver D was in the non-waking state, but at a time T2 in the duration of the override operation, the driver D changes from the non-waking state to the waking state.

In this case, since the driver D changes to the waking state in the course of the override operation, naturally, the override operation which has been performed from the time T1 is likely to be an erroneous operation has been unwittingly performed by the driver D. Therefore, if the vehicle C is switched from the self-driving mode to the manual driving mode, the vehicle C may be put into a dangerous situation by abrupt change or the like.

However, since the driver D awakens at the time T2, if the wakefulness becomes higher, even if the driver D is permitted to manually drive the vehicle C, the vehicle C is likely to travel safely.

Therefore, in the driving assistance method according to the present embodiment, as shown in FIG. 1C, after when the override operation is started at the time T1, in the period to the time T2 when the driver D is in the non-waking state, similarly to the comparative example of FIG. 1B, switching to manual driving is invalidated (STEP S2). Also, even after the driver D changes to the waking state, for a predetermined period, i.e. a period from the time T2 to a time T3, invalidation of STEP S2 is continued (STEP S3).

Moreover, in the driving assistance method according to the present embodiment, if the predetermined period from the time T2 to the time T3 ends, the vehicle C is switched to the manual driving mode (STEP S4), such that the driver D manually drives the vehicle C. In other words, the predetermined period in this case is a period required for the wakefulness of the driver D who has just awakened, i.e. who is in a semi-waking state to become high.

When the predetermined period ends, in the driving assistance method according to the present embodiment, it is considered that the wakefulness of the driver D has increased to such a degree that he can manually drive, and switching to the manual driving mode is performed. Therefore, when the driver D is in the semi-waking state, it is possible to prevent the driver from being permitted to manually drive, thereby preventing the driver from putting the vehicle C in a dangerous situation.

Also, as a modification, the above-mentioned predetermined period for which invalidation is continued may be, for example, a period from when the driver D becomes the waking state at least to when the driver D releases the override operation.

In other words, in this case, even though an override operation which is an erroneous operation is released, since the vehicle C automatically keeps the self-driving mode without transitioning to override control, the vehicle C cannot be abruptly changed. Also, it can be considered that in the case where after release of the erroneous override operation, when the driver D who is in the waking state intentionally performs a new override operation, if the vehicle C is switched from the self-driving mode to the manual driving mode in response to the new override operation, the vehicle C is unlikely to get into a dangerous situation due to sudden change or the like.

In this case, it is possible to prevent the vehicle C from getting into a dangerous situation even if the driver D changes from the non-waking state to the waking state in the course of an override operation.

Hereinafter, the driving assistance device 10 adopting the above-mentioned driving assistance method according to the present embodiment, and the in-vehicle system 100 having the driving assistance device 10 will be described in more detail.

Figure 2A:
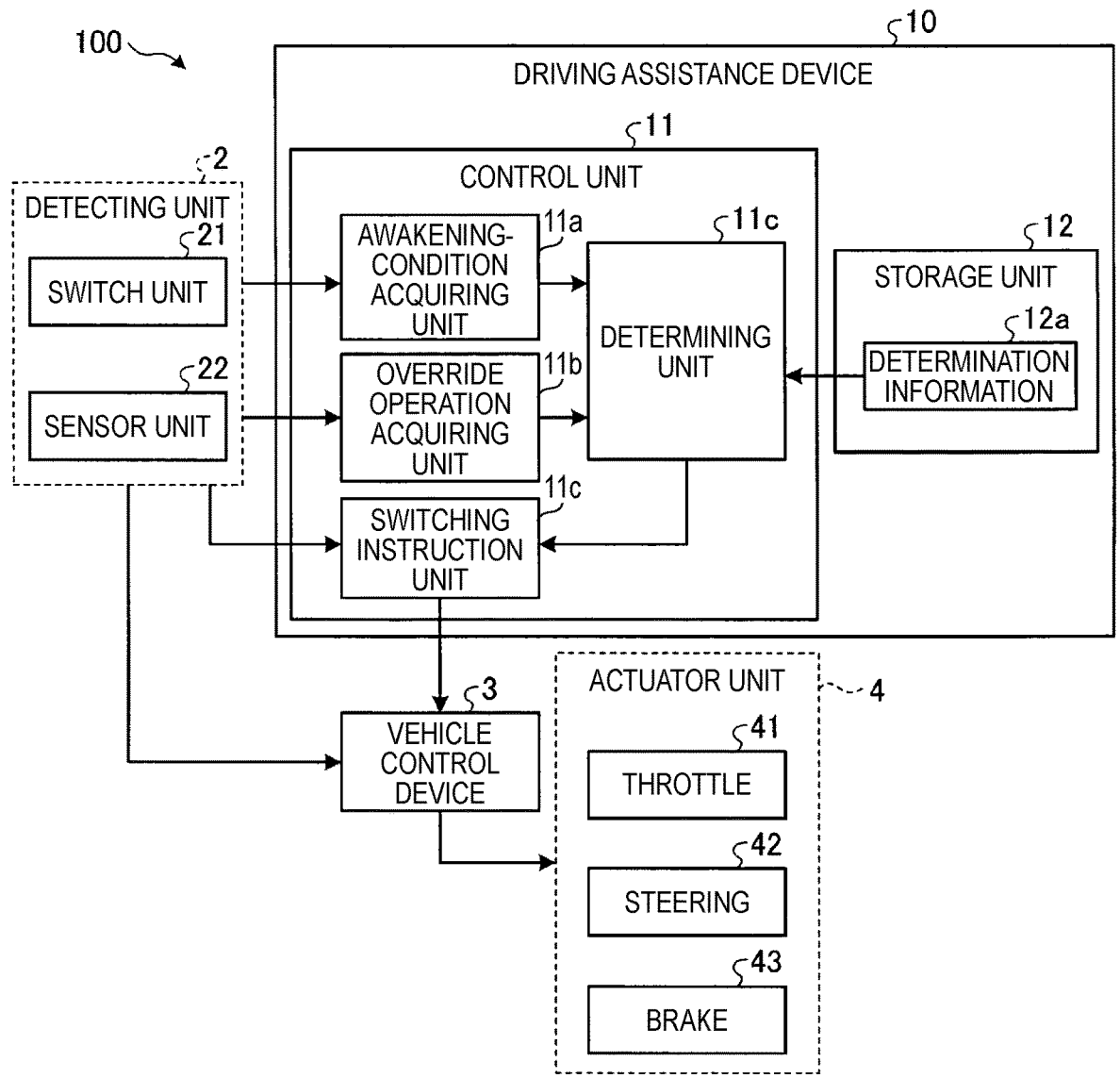
FIG. 2A is a block diagram of an in-vehicle system according to the embodiment.
Figure 2B:
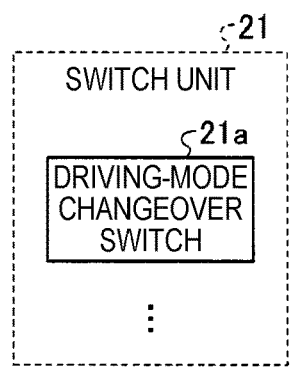
FIG. 2B is a block diagram of a switch unit.
Figure 2C:
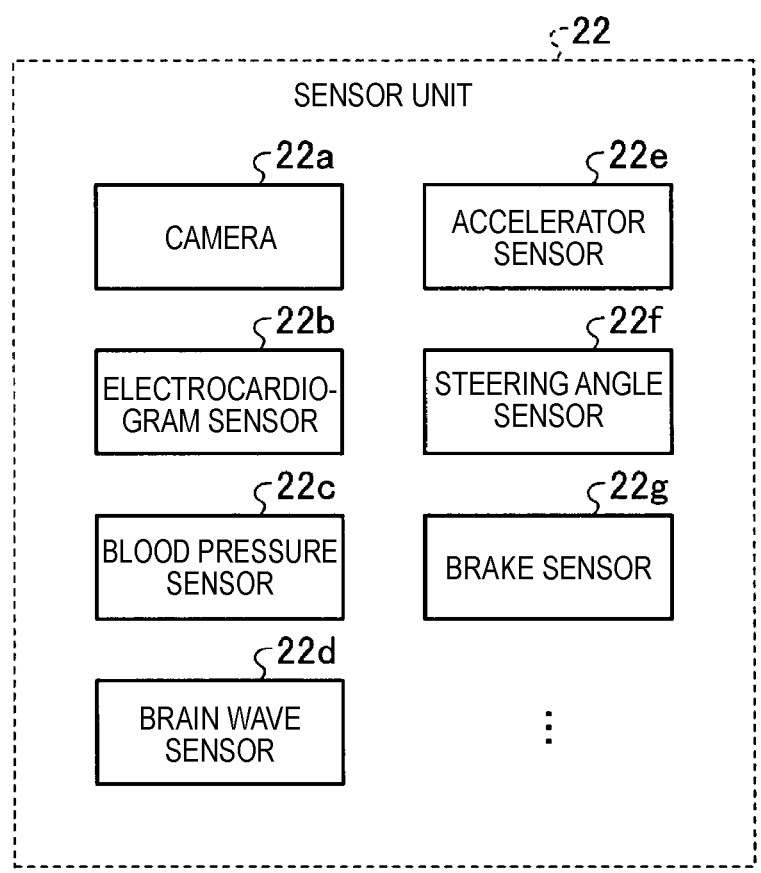
FIG. 2C is a block diagram of a sensor unit.

FIG. 2A is a block diagram illustrating the in-vehicle system 100 according to the present embodiment. Also, FIG. 2B is a block diagram illustrating a switch unit 21. Also, FIG. 2C is a block diagram illustrating a sensor unit 22. However, in FIG. 2A to FIG. 2C, only components necessary to explain features of the present embodiment are shown by functional blocks, and general components are not shown.

In other words, the components shown in FIG. 2A to FIG. 2C are functionally conceptual, and do not need to have a physically configuration as shown in FIG. 2A to FIG. 2C. For example, distribution or integration of the individual functional blocks is not limited to a specific mode shown in FIG. 2, and it is possible to distribute or integrate all or a part thereof functionally or physically in an arbitrary unit, depending on various loads, usage conditions, and so on.

As shown in FIG. 2A, the in-vehicle system 100 includes the driving assistance device 10. The driving assistance device 10 is connected to each of a detecting unit 2 and a vehicle control device 3 mounted on the vehicle C such that communication is possible.

The detecting unit 2 includes the switch unit 21 and the sensor unit 22. The switch unit 21 is a group of switches which can be operated by the driver D, and includes, for example, a driving-mode changeover switch 21a and so on as shown in FIG. 2B. The driving-mode changeover switch 21a is a switch for manually switching between the self-driving mode and the manual driving mode.

Also, the sensor unit 22 is a group of devices for detecting the awakening conditions of the driver D, operations of the driver D related to driving of the vehicle C, and so on, and includes a camera 22a, an electrocardiogram sensor 22b, a blood pressure sensor 22c, a brain wave sensor 22d, an accelerator sensor 22e, a steering angle sensor 22f, a brake sensor 22g, and so on as shown in FIG. 2C. Also, the electrocardiogram sensor 22b, the blood pressure sensor 22c, and the brain wave sensor 22d are installed so as to be attachable to and detachable from the driver D, for example, when the driver D is in the vehicle C.

Referring to FIG. 2A again, the vehicle control device 3 controls traveling of the vehicle C. Specifically, in the self-driving mode, the vehicle control device 3 derives amounts of control for a throttle 41, a steering 42, a brake 43, and so on of an actuator unit 4 of the vehicle C according to road conditions and so on, and operates the actuator unit 4 on the basis of the derived control amounts, thereby making the vehicle C travel by itself while controlling acceleration, steering, and braking of the vehicle C.

Also, in the manual driving mode, the vehicle control device 3 derives amounts of control for the throttle 41, the steering 42, the brake 43, and so on, on the basis of the amounts of operations of the driver D calculated results of detection of the accelerator sensor 22e, the steering angle sensor 22f, the brake sensor 22g, and the like of the sensor unit 22, thereby making the vehicle C travel under manual control on acceleration, steering, and braking of the vehicle C.

Also, the vehicle control device 3 switches the vehicle C to the self-driving mode or the manual driving mode on the basis of instructions from a switching instruction unit 11d (to be described below).

Also, the driving assistance device 10 includes a controller 11 and a storage unit 12. The controller 11 includes an awakening-condition acquiring unit 11a, an override operation acquiring unit 11b, a determining unit 11c, and the switching instruction unit 11d. The controller 11 is configured to include at least one hardware processor and execute some programs.

The storage unit 12 is a storage device called a hard disk drive, a non-volatile memory, or a register, and stores determination information 12a. The determination information 12a is information including determination conditions and so on to be referred to by the determining unit 11c. For example, in the present embodiment, the determination information includes a parameter representing the above-mentioned predetermined period, and so on.

The controller 11 controls the whole of the driving assistance device 10. The awakening-condition acquiring unit 11a acquires the awakening conditions of the driver D based on detection results of the detecting unit 2. Specifically, the awakening-condition acquiring unit 11a derives each of parameters related to the awakening conditions of the driver D on the basis of detection results of the detecting unit 2.

For example, the awakening-condition acquiring unit 11a analyzes images acquired by the camera 22a of the sensor unit 22, and derives the direction of the face of the driver D, the degree to which the eyes of the driver D are opened (the opened state of the eyes), and the blinking frequency of the driver.

Also, for example, the awakening-condition acquiring unit 11a analyzes the detection result of the electrocardiogram sensor 22b of the sensor unit 22, and derives the heart rate of the driver D on the basis of the analysis result. Also, for example, the awakening-condition acquiring unit 11a analyzes the detection result of the blood pressure sensor 22c of the sensor unit 22, and derives the systolic blood pressure and diastolic blood pressure of the driver D on the basis of the analysis result. Also, for example, the awakening-condition acquiring unit 11a analyzes the detection result of the brain wave sensor 22d of the sensor unit 22, and derives the brain wave during sleep of the driver D on the basis of the analysis result.

Then, the awakening-condition acquiring unit 11a notifies the derived parameters related to the awakening conditions to the determining unit 11c.

The override operation acquiring unit 11b acquires override operations of the driver D on the basis of detection results of the detecting unit 2 during self-driving. The override operation acquiring unit 11b notifies the contents of the acquired override operations to the determining unit 11c.

The determining unit 11c derives the wakefulness on the basis of the parameters related to the awakening conditions of the driver D and derived by the awakening-condition acquiring unit 11a. For example, in the case where the derived wakefulness exceeds a predetermined threshold, the determining unit determines that the driver D is in the waking state. Also, for example, if the wakefulness does not exceed the predetermined threshold, the determining unit 11c determines that the driver D is in the non-waking state.

Figure 3A:
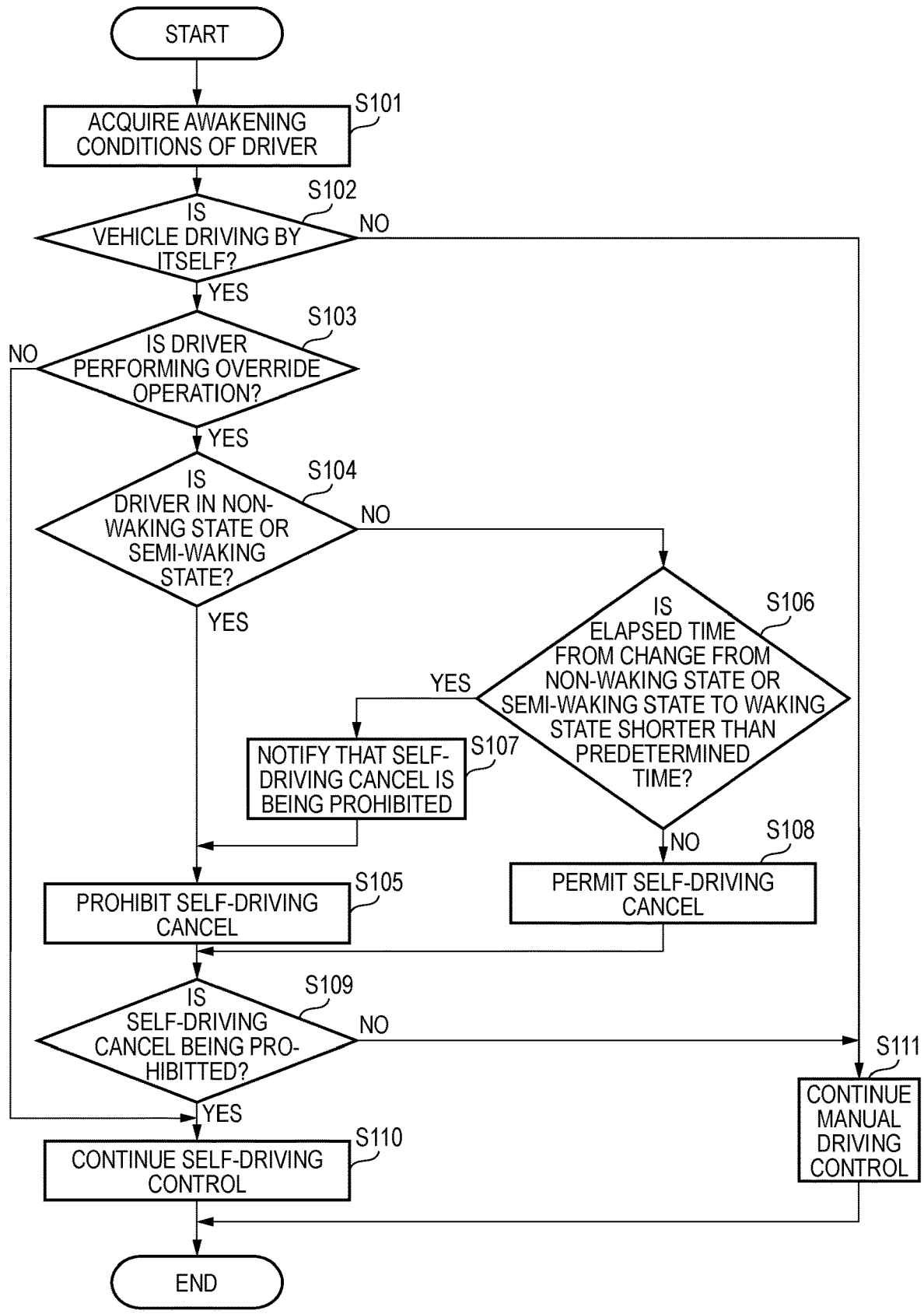
FIG. 3A is a flow chart illustrating a proceeding procedure which is performed by a driving assistance device according to the embodiment.
Figure 3B:
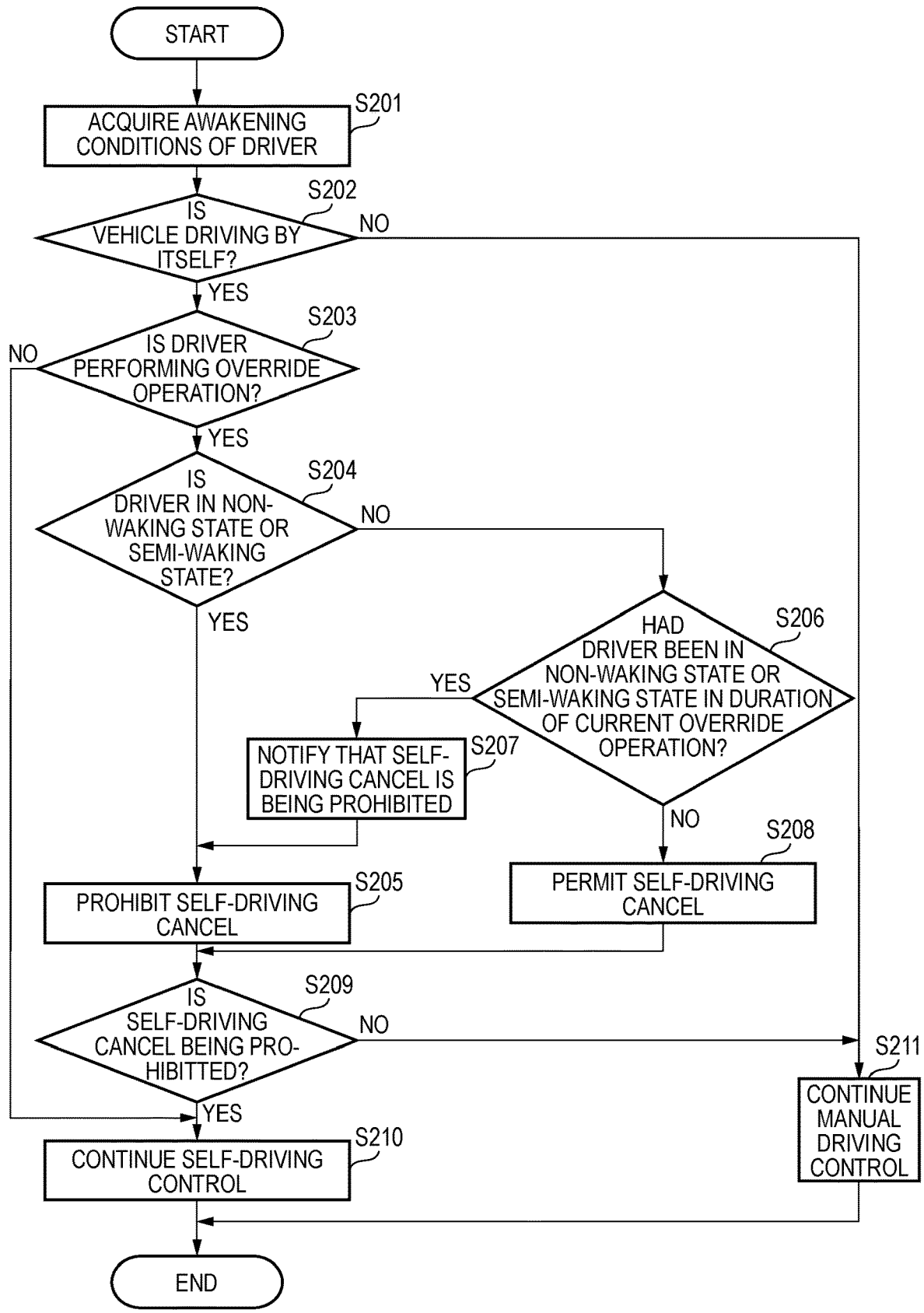
FIG. 3B is a flow chart illustrating a proceeding procedure which is performed by a driving assistance device according to a modification.

Also, if it is determined that an override operation has started in the course of self-driving, on the basis of results of determination on the awakening conditions and the contents of notifications from the override operation acquiring unit 11b, the determining unit 11c performs a process of determining whether to permit or prohibit self-driving cancel, on the basis of the awakening conditions of the driver D. Details of this determining process are shown in FIG. 3A or FIG. 3B.

In the case where self-driving cancel has been permitted on the basis of the result of determination of the determining unit 11c, the switching instruction unit 11d instructs the vehicle control device 3 to switch the vehicle C from the self-driving mode to the manual driving mode. In other words, switching to the manual driving mode is validated.

Meanwhile, in the case where self-driving cancel has been prohibited on the basis of the result of determination of the determining unit 11c, the switching instruction unit 11d does not instruct the vehicle control device 3 to switch the vehicle C from the self-driving mode to the manual driving mode. In other words, switching to the manual driving mode is invalidated.

Also, if the switching instruction unit 11d receives a switching request from the driving-mode changeover switch 21a of the switch unit 21, in response to this request, it instructs the vehicle control device 3 to switch between the self-driving mode and the manual driving mode.

Now, processing procedures which are performed by the driving assistance device 10 according to the present embodiment will be described with reference to FIG. 3A and FIG. 3B. FIG. 3A is a flow chart illustrating a proceeding procedure which is performed by the driving assistance device 10 according to the present embodiment. Also, FIG. 3B is a flow chart illustrating a proceeding procedure which is performed by a driving assistance device 10 according to a modification. Also, the proceeding procedures shown in FIG. 3A and FIG. 3B are repeated in predetermined cycles.

As shown in FIG. 3A, first, the awakening-condition acquiring unit 11a acquires the awakening conditions of the driver D (STEP S101). Subsequently, the controller 11 determines whether the vehicle is driving by itself (STEP S102). In the case where it is determined that the vehicle is driving by itself ("Yes" in STEP S102), the determining unit 11c determines whether the driver is performing an override operation, on the basis of the content of a notification from the override operation acquiring unit 11b (STEP S103). Meanwhile, in the case where it is determined in STEP S102 that the vehicle is not driving by itself ("No" in STEP S102), manual driving control is continued (STEP S111), and the processing is finished.

In the case where it is determined in STEP S103 that the driver is performing an override operation ("Yes" in STEP S103), the determining unit 11c determines whether the driver D is in the non-waking state or the semi-waking state, or not, on the basis of the result of acquisition of the awakening-condition acquiring unit 11a (STEP S104).

In the case where it is determined that the driver is in the non-waking state or the semi-waking state ("Yes" in STEP S104), the determining unit 11c prohibits self-driving cancel (STEP S105). Meanwhile, in the case where it is determined in STEP S103 that the driver is not performing an override operation ("No" in STEP S103), self-driving control is continued (STEP S110), and the processing is finished.

Meanwhile, in the case where it is determined in STEP S104 that the driver is not in the non-waking state or the semi-waking state ("No" in STEP S104), i.e. the driver D is in the waking state, the determining unit 11c determines whether the elapsed time from change of the driver D from the non-waking state or the semi-waking state to the waking state is shorter than a predetermined time (STEP S106).

In the case where it is determined that the elapsed time is shorter than the predetermined time ("Yes" in STEP S106), a notification representing that although the driver is performing an override operation, self-driving cancel is being prohibited is given to the driver D (STEP S107). Since it is considered that the driver D does not understand the situation at the moment for a short time after change from the non-waking state or the semi-waking state to the waking state, in STEP S107, when the driver D is in such a state, the situation at the moment is given to the driver, whereby the driver's intention is called. However, STEP S107 may not be essential. Subsequently, the determining unit 11c prohibits self-driving cancel (STEP S105).

Meanwhile, in the case where it is determined in STEP S106 that the elapsed time is not shorter than the predetermined time ("No" in STEP S106), the determining unit 11c permits self-driving cancel (STEP S108).

Subsequently, whether self-driving cancel is being prohibited (STEP S109). In the case where self-driving cancel is being prohibited ("Yes" in STEP S109), the switching instruction unit 11d invalidates switching from self-driving to manual driving, and self-driving cancel is continued (STEP S110), and the processing is finished.

Meanwhile, in the case where self-driving cancel is not being prohibited ("No" in STEP S109), i.e. in the case where self-driving control is being permitted, the switching instruction unit 11d validates switching from self-driving to manual driving, and the vehicle C is switched from the self-driving mode to the manual driving mode, and manual driving control is performed (STEP S111), and the processing is finished. Also, although not shown in the drawings, in the case where an override operation is performed when the vehicle is in the self-driving mode, whereby the vehicle is switched to the manual driving mode, if the override operation finishes, the vehicle is switched to the self-driving mode.

FIG. 3A corresponds to a proceeding procedure which is performed in the case where the above-mentioned predetermined period is a period from change of the driver awakens from the non-waking state or the semi-waking state to the waking state, i.e. a period required for the wakefulness of the driver having just awakened to become high. However, in a modification, for example, the predetermined period may be a period from change of the driver D to the waking state to release of the override operation of the driver D.

FIG. 3B shows a proceeding procedure according to that modification. Also, STEPS S201 to S211 of FIG. 3B correspond to STEPS S101 to S111 of FIG. 3A, and the difference from FIG. 3A is a condition for determination of STEP S206. Therefore, hereinafter, STEP S206 and the subsequent steps will be described mainly.

Specifically, in the proceeding procedure according to the modification, in STEP S206, the determining unit 11c determines whether the driver D had been in the non-waking state or the semi-waking state in the duration of the current override operation (STEP S206).

Here, the duration of the current override operation corresponds to a period from it was determined for the first time in STEP S203 that an override operation was being performed ("Yes" in STEP S203) to when it was determined in STEP S203 of the proceeding procedure of FIG. 3B repeated periodically that the override operation was not being performed ("No" in STEP S203), i.e. a period from start of the current override operation to end of the current override operation.

In the case where it is determined that the driver D had been in the non-waking state or the semi-waking state in the duration of the current override operation ("Yes" in STEP S206), since it is considered that the driver D had been performing the override operation in the non-waking state or the semi-waking state when the vehicle had been in the self-driving mode and awakened in that state, the processing is performed in the order of STEP S207 and STEP S205.

In this case, it is determined in STEP S209 that self-driving cancel is being prohibited ("Yes" in STEP S209), and self-driving control is continued (STEP S210). While an override operation started in the non-waking state or the semi-waking state is continued, even though the driver D awakens, the proceeding procedure is repeated as described above, and switching to the manual driving mode is not performed.

Thereafter, if the driver D releases the current override operation from the above-mentioned state, it is determined in STEP S203 that the driver is not performing any override operation ("No" in STEP S203), i.e. that the override operation has finished, and self-driving control is continued (STEP S210). Thereafter, if the driver D performs an override operation in the waking state, the proceeding procedure is performed in the order of STEP S203 ("Yes"), STEP S204 ("No"), STEP S206 ("No"), STEP S208, STEP S209 ("No"), and STEP S211, whereby self-driving cancel is permitted and switching to manual driving control is performed. As described above, in this modification, the above-mentioned predetermined period is a period from when "Yes" was determined in STEP S206 to when "No" is determined in STEP S203, i.e. a period from when the driver D awakened to when the driver D releases the override operation.

Meanwhile, in the case where it is determined in STEP S206 that the driver D had not been in the non-waking state or the semi-waking state in the duration of the current override operation ("No" in STEP S206), the determining unit 11c permits self-driving cancel (STEP S208). Subsequently, it is determined in STEP S209 that self-driving cancel is not being prohibited ("No" in STEP S209), and the vehicle C is switched from the self-driving mode to the manual driving mode, and manual driving control is performed (STEP S211).

Therefore, it is possible to prevent the vehicle C from getting into a dangerous situation even if the driver D changes from the non-waking state to the waking state in the course of an override operation.

As described above, the driving assistance device 10 according to the present embodiment is supports driving of the vehicle C equipped with the driving assistance device 10 such that if the driver D starts an override operation (corresponding to an example of a driving-related operation) when self-driving is being performed, switching from self-driving to manual driving is performed, and includes the awakening-condition acquiring unit 11a (corresponding to an example of an acquiring unit) and the determining unit 11c.

The awakening-condition acquiring unit 11a acquires the awakening conditions of the driver D (corresponding to conditions of a driver). In the case where the awakening conditions of the driver D acquired when an override operation was started represents the non-waking state, the determining unit 11c determines to invalidate switching to manual driving, and if the driver D awakens when invalidation is being performed, the determining unit determines to continue invalidation for a predetermined period.

Therefore, according to the driving assistance device 10 of the present embodiment, it is possible to prevent the vehicle C form getting into a dangerous situation even if the driver D awakens from the non-waking state in the course of an override operation.

Also, the predetermined period is a period from change of the awakening conditions of the driver D from the non-waking state to the waking state.

Therefore, according to the driving assistance device 10 of the present embodiment, since it is possible to wait for the wakefulness of the driver D to increase to such a degree that he can manually drive, it is possible to prevent the driver from putting the vehicle C in a dangerous situation.

Also, the above-mentioned predetermined period is a period from change of the awakening conditions of the driver D from the non-waking state to the waking state to at least release of the override operation.

Therefore, according to the driving assistance device 10 of the present embodiment, since invalidation of switching to manual driving is continued at least until an override operation likely to be an erroneous operation, it is possible to prevent switching to manual driving from being performed on the basis of an involuntary override operation, thereby preventing the driver D from putting the vehicle C in a dangerous situation in alarm.

Also, in the above-described embodiment, the case of passively waiting for the wakefulness of the driver D to become high for the predetermined period has been described; however, for the predetermined period, it is also possible to actively encourage the driver D such that the wakefulness becomes high. For example, for the predetermined period, the driving assistance device issues a warning such as an audio guidance message representing action which the driver should take, such that the wakefulness of the driver D becomes high. Such a process may be performed in STEP S107 of FIG. 3A or STEP S207 of FIG. 3B.

In this case, since the driver D is encouraged for the predetermined period such that the wakefulness becomes high, it is possible to prevent the driver from putting the vehicle C in a dangerous situation.

Various advantages and modifications can be easily achieved by those skilled in the art. Therefore, the invention in its broader aspects is not limited to the specific details and representative embodiments shown and described above. Accordingly, various modifications may be made without departing from the spirit or scope of the general inventive concept as defined by the appended claims and their equivalents.

What is claimed is:

1. A driving assistance device for supporting driving of a vehicle equipped with the driving assistance device such that if a driver starts a driving-related operation in the course of self-driving, switching from self-driving to manual driving is performed, comprising:
   an acquiring unit configured to acquire conditions of the driver; and
   a determining unit configured to determine to invalidate switching to manual driving in the case where the conditions of the driver acquired when the operation was started represents a non-waking state, and determine to continue the invalidation for a predetermined period if the driver changes from the non-waking state to a waking state when the invalidation is being performed.

2. The driving assistance device according to claim 1, wherein:
   the predetermined period is a period from a point of changing of the conditions of the driver from the non-waking state to the waking state.

3. The driving assistance device according to claim 1, wherein:
   the predetermined period is a period from change of the conditions of the driver from the non-waking state to the waking state to at least release of the operation.

4. The driving assistance device according to claim 1, wherein:
   the determining unit determines to issue a warning from a sound unit of the vehicle to the driver for the predetermined period.

5. A driving assistance method of supporting driving of a vehicle adopting the driving assistance device such that if a driver starts a driving-related operation in the course of self-driving, switching from self-driving to manual driving is performed, comprising:
   acquiring conditions of the driver; and
   determining to invalidate switching to manual driving in the case where the conditions of the driver acquired when the operation was started represents a non-waking state, and determining to continue the invalidation for a predetermined period if the driver changes from the non-waking state to a waking state when the invalidation is being performed.

* * * * *